United States Patent [19]

Rautila

[11] Patent Number: 5,669,069
[45] Date of Patent: Sep. 16, 1997

[54] CARD READING CONFIGURATION IN A MOBILE PHONE

[75] Inventor: Heikki Rautila, Espoo, Finland

[73] Assignee: Nokia Mobile Phones Limited, Salo, Finland

[21] Appl. No.: 423,979

[22] Filed: Apr. 18, 1995

[30] Foreign Application Priority Data

Apr. 19, 1994 [FI] Finland .................. 941812

[51] Int. Cl.⁶ .................. H04B 1/38
[52] U.S. Cl. .................. 455/558; 455/90; 455/348; 379/428; 379/433
[58] Field of Search .................. 455/89, 90, 127, 455/348, 349, 351; 379/58, 357, 428, 433; 235/441, 392

[56] References Cited

U.S. PATENT DOCUMENTS

| | | | |
|---|---|---|---|
| 5,109,540 | 4/1992 | Dzung | 455/89 |
| 5,136,229 | 8/1992 | Galvin | 455/127 |
| 5,252,815 | 10/1993 | Pernet | 235/441 |
| 5,257,414 | 10/1993 | Trahan | 455/90 |
| 5,361,459 | 11/1994 | Hyvonen et al. | 24/35 |
| 5,436,969 | 7/1995 | Kobayashi | 379/433 |
| 5,487,099 | 1/1996 | Maekawa | 455/90 |

FOREIGN PATENT DOCUMENTS

| | | |
|---|---|---|
| 0475210 | 3/1992 | European Pat. Off. |
| 0505932 | 9/1992 | European Pat. Off. |
| 0522762 | 1/1993 | European Pat. Off. |
| 0616458 | 9/1994 | European Pat. Off. |

*Primary Examiner*—Reinhard J. Eisenzopf
*Assistant Examiner*—Thanh Le
*Attorney, Agent, or Firm*—Perman & Green

[57] ABSTRACT

The invention relates to a card reading configuration in a mobile phone, comprising a space in the housing (1) for the SIM card (8), the space being covered by the battery unit. The walls (2) defining the space laterally are provided with grooves (6), which serve to guide the card (8) into position and to position it in other directions than the longitudinal direction (A). The configuration is such that it requires the battery unit to be pushed in the longitudinal direction (A) at the end of its insertion, the stopper in the battery unit thus pressing the card against the stop (15), which positions the card in the longitudinal direction. The battery unit also keeps the card pressed against the contacts placed below the card.

1 Claim, 3 Drawing Sheets

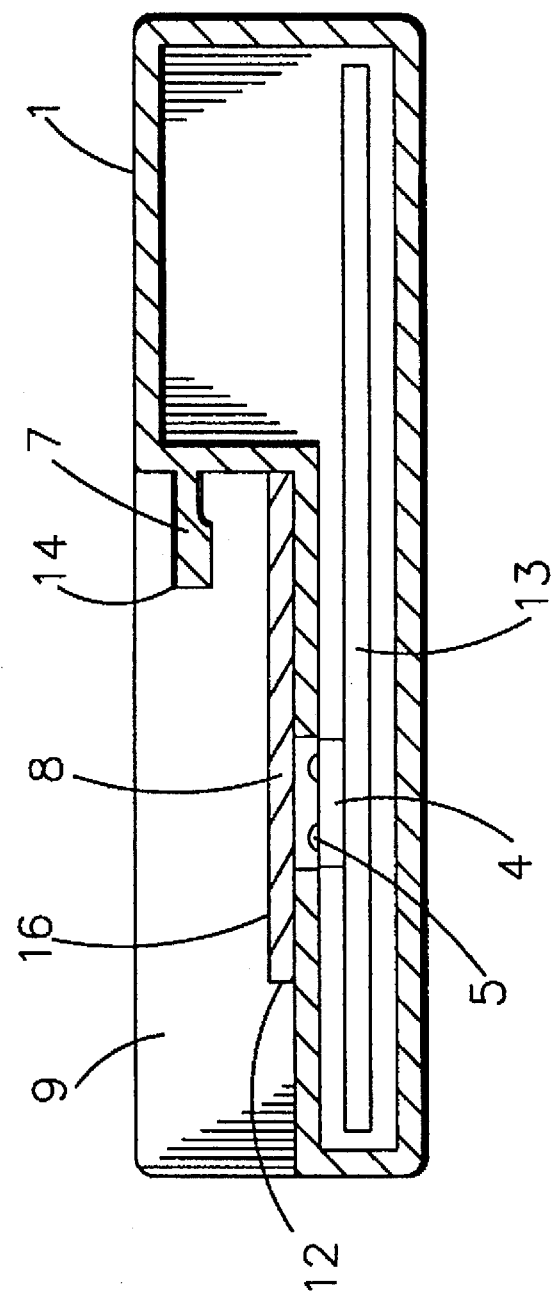

CARD READING CONFIGURATION IN A MOBILE PHONE

BACKGROUND OF THE INVENTION

The invention relates to a card reading configuration in a mobile phone, more specifically to a card reading configuration for reading a subscriber card of the size of a credit card in a bakery-driven small-sized mobile phone.

For the operation of the phone, some mobile phone systems require an information card, "SIM card", which is inserted in its reading unit for subscriber identification, among other functions the basic SIM card is a card complying with ISO 7816 standard, which is of the size of an ordinary credit card, i.e, with a width of c. 54 mm and a length of c. 84 mm.

Recent developments in mobile phone systems allow subscribers to increasingly use very small battery-driven handsets, "pocket phones", with a typical size of 60×170×25 mm. This kind of phones have in fact become extremely popular. A conventional card reading arrangement is obviously not adequate for reading an ISO standard card in such a small mobile phone, the conventional design being a casing surrounding the card on all sides except for the insertion opening, and provided with contacts for card reading and a connection to the electronics that carry out the actual reading. The present situation calls for solutions enabling the space required for the card reader in a mobile phone to be reduced to a minimum size.

The applicant's former EP patent application 522 762 discloses a configuration, illustrated in FIGS. 1 and 2, in which the card space and the contacts required for reading the card are disposed such that the battery unit acts as a cover fitting over the space. The objective of the present invention is to further improve this set-up so as to provide a reliable card reading configuration which is easy to operate and requires a minimum of space.

SUMMARY OF THE INVENTION

In one aspect, the present invention provides a mobile phone comprising:

a housing having a space for receiving a card;

a battery unit slidably engageable with the housing to close off the space;

the battery unit including a first stopper for bearing against a rear edge of the card during sliding engagement with the housing, whereby to positively locate the card.

In another aspect, the present invention provides a mobile phone comprising:

a housing having an information card space which is defined by a support surface and side walls, the side walls including formations for entraining opposed edges of an information card during sliding movement along the support surface;

a contact provided in the information card space by which information can be read from an information card; and a battery unit co-operable with the housing to cover the information card space, the battery unit including a stopper to positively locate an information card in the space.

In yet another aspect, the present invention provides a card reading configuration in a mobile phone, comprising a space for the card in the housing, the space being covered by the battery unit as it is put into position, and being laterally defined by the side walls of the housing, and provided with contacts joining matching contact areas in the card with the card in position, characterized in that it comprises:

guide grooves in the side walls of the space, which the edges of the card engage as the card is being inserted, and serving to position the card laterally and to stop the card essentially totally from moving in any other direction than the longitudinal direction of the card and the housing;

a stop in the housing, which serves to position the card and to limit its movement in the said longitudinal direction as the card is being inserted;

matching guide members in the battery unit and in the housing, which require the battery unit to be pushed in the said longitudinal direction at the end of its insertion;

a first stopper of the battery unit, which at the end of the insertion of the battery unit presses against the rear edge of the card relative to the pushing direction, thus forcing the card into the location determined by the guide grooves and the stop; with the battery unit in position; and a second stopper of the battery unit, which presses against the card and keeps is pressed against the contacts when the battery unit is in position.

BRIEF DESCRIPTION OF THE DRAWINGS

One embodiment of the invention will be described in further detail below, with reference to the accompanying drawings, in which:

FIG. 5 is a schematic view of a longitudinal section of a mobile phone, with the SIM card in place in the embodiment of the card reading configuration of the invention illustrated here.

DESCRIPTION OF THE PREFERRED EMBODIMENTS

Figure 1:
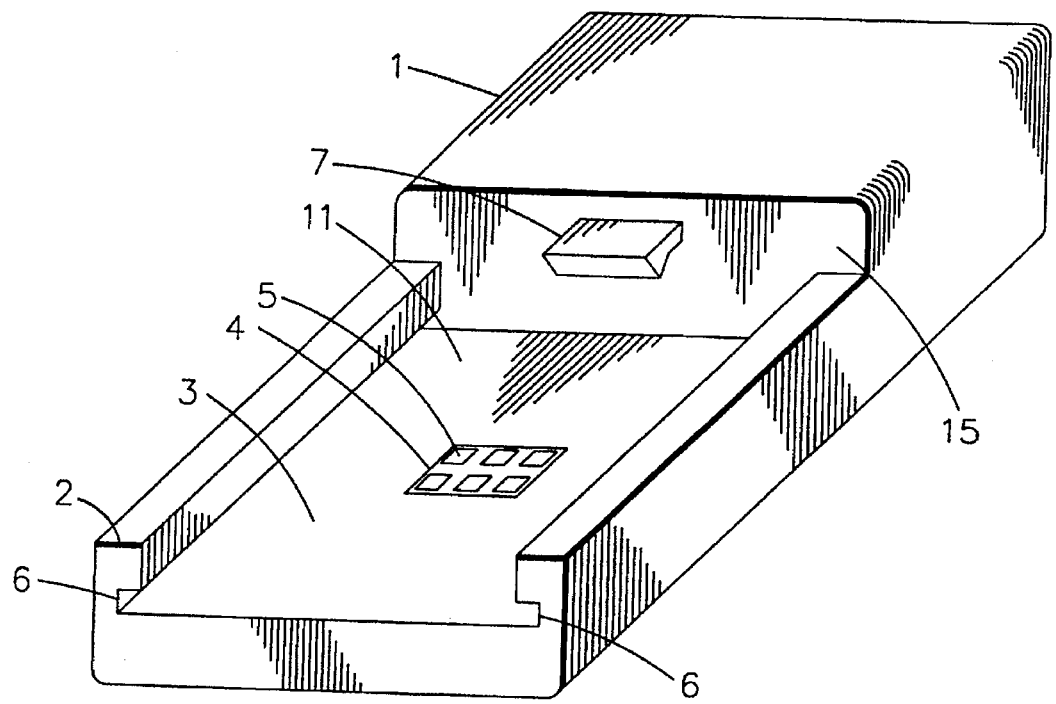
FIG. 1 is a schematic perspective view of the mobile phone housing, implementing one embodiment of the card reading configuration of the invention.
Figure 2:
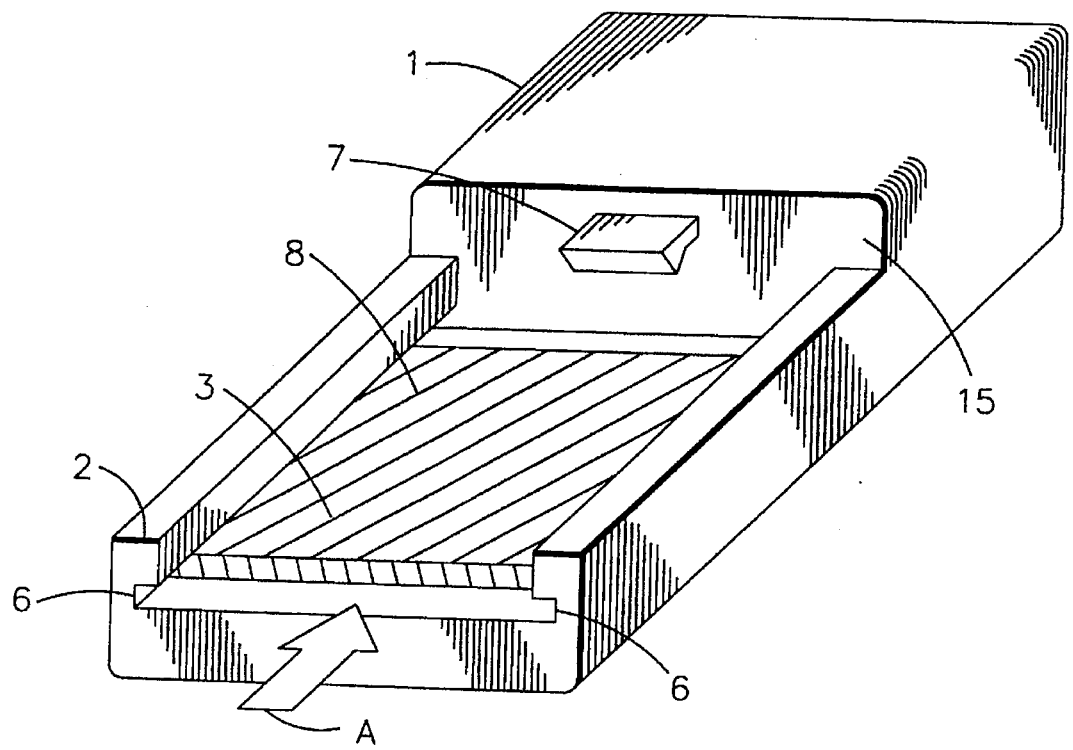
FIG. 2 is a similar view of the mobile phone housing illustrated in FIG. 1, with the card inserted approximately in position.

FIGS. 1 to 4 are schematic views of the card reading configuration and its operation in a mobile phone according to the invention. The Figures show the parts of the mobile phone alone that are necessary for illustrating the invention. The mobile phone housing 1 is provided with a space 11 for the SIM card 8 to be covered by the battery unit 9, the space being laterally defined by the side walls 2 of the housing 1 and the transverse wall 15, and having a plane surface 3, onto which the card is placed. The plane surface has an opening for a connector 4, which is provided with contacts 5, which, with the card in position, will join corresponding contact areas in the card, not illustrated in the Figures. The side walls 2 are provided with guide grooves 6, defined by the plane surface 3 on one side, the card edges 8 engaging these grooves as the card is being inserted into position in the longitudinal direction of the mobile phone and the card, indicated by arrow A in FIG. 2. The guide grooves 6 serve to position the card in the lateral direction, and to stop it essentially totally from moving in any other direction than the longitudinal one.

Figure 3:
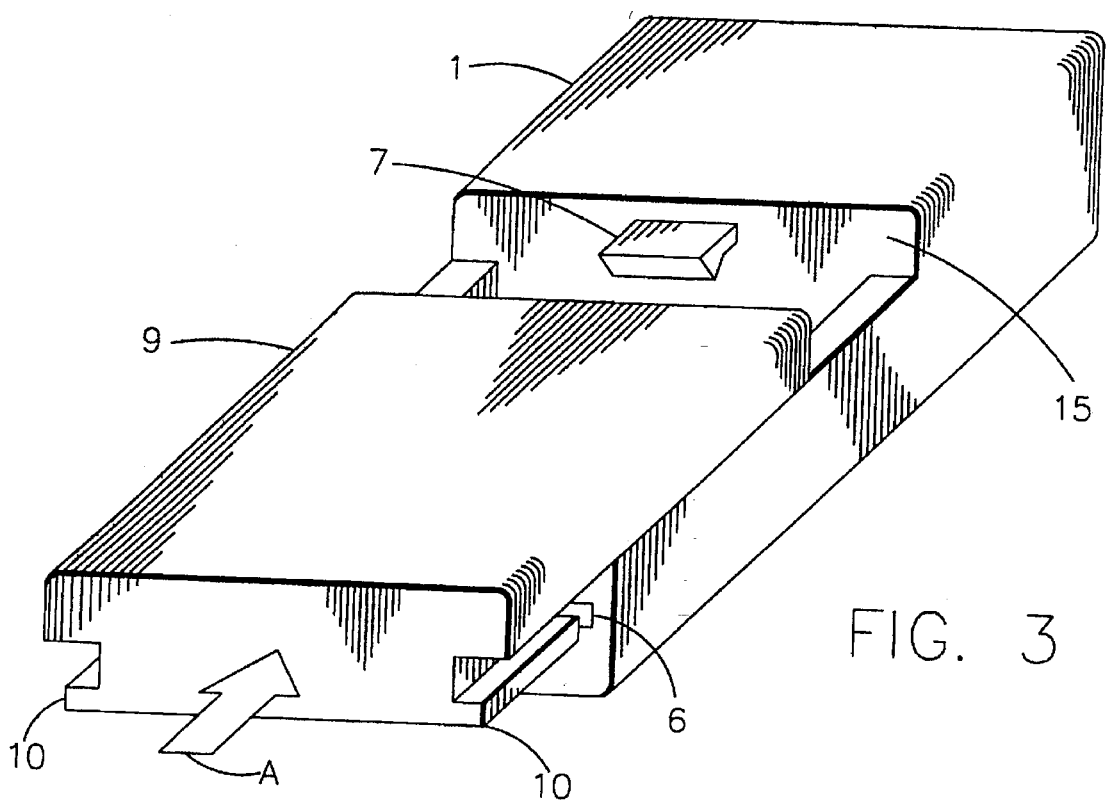
FIG. 3 is a similar view illustrating the battery unit being put into position in the mobile phone housing, with the card approximately positioned as illustrated in FIG. 2.
Figure 4:
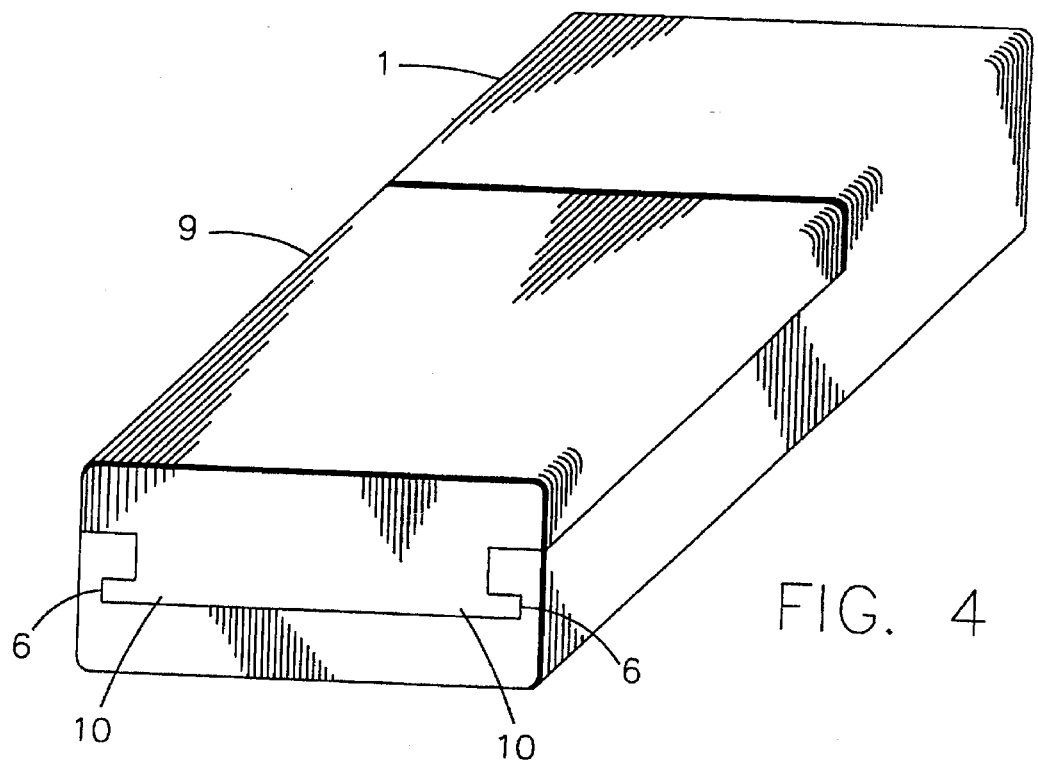
FIG. 4 is a similar view of a mobile phone with the battery unit in position and with the card enclosed in the mobile phone.

The battery unit 9 has a design such that, while being fitted into position, it has eventually to be pushed in the longitudinal direction indicated by arrow A, as illustrated in FIG. 3. In The embodiment illustrated by FIGS. 1 to 4, the rear end of the battery unit 9 relative to the pushing direction is provided with guides 10 engaging the guide grooves 6 over a distance not occupied by the card. In addition, the battery unit 9 is provided with means which, as the card is being inserted, will press against its rear edge relative to the direction of insertion of the card 8, and thus will press the card 8 into the correct position; with the front end of the card facing a stop in the housing 1.

As illustrated by the Figures, in this embodiment the stop consists of the wall 15 of the compartment 11 placed in the front end relative to the insertion direction A. The rear end of the battery unit 9 may be provided with a shoulder 12 acting as a stopper means, for instance as illustrated in FIG. 5, and this shoulder may cover the entire width of the battery unit 9, and may be joined by the front ends of the guides 10. The longitudinal section shown in FIG. 6 also shows schematically a circuit card within the housing 1, with a connector 4 connected to the circuit card, and also matching locking means 7 and 14 in the housing and in the battery unit, by means of which the battery unit is locked to the housing when pushed into position. In the embodiment described here, the housing 1 is equipped with a locking tongue 7, which engages a matching recess 14 in the battery unit. The battery unit 9 being in position, its lower surface 16 will keep the card 8 pressed against the contacts 5.

The following advantages are achieved with the described embodiment of the invention: an economic design easy to use, which does not require extra parts and no moving mechanical parts at all for the reader; a card reader configuration that requires a minimum space in the mobile phone; a configuration ensuring correct positioning of the card, even if the user does not insert it with proper care, and after insertion, firm retention of the card.

It will be appreciated by those skilled in the art that a battery unit design, which involves pushing in the longitudinal direction at the end of insertion, can be implemented in various ways, and is not confined to the guide arrangement of this embodiment. Similarly, the stop in the housing limiting the movement of the card and the stopper means in the battery unit may also vary in many ways within the scope of the invention.

What is claimed is:

1. A card reading configuration in a mobile phone, comprising a space for the card in the housing, the space being covered by the battery unit as it is put into position, and being laterally defined by the side walls of the housing, and provided with contacts joining matching contact areas in the card with the card in position, characterized in that it comprises:

guide grooves in the side walls of the space, which the edges of the card engage as the card is being inserted, and serving to position the card laterally and to stop the card essentially totally from moving in any other direction than the longitudinal direction of the card and the housing;

a stop in the housing, which serves to position the card and to limit its movement in the said longitudinal direction as the card is being inserted;

matching guide members in the battery unit and in the housing, which require the battery unit to be pushed in the said longitudinal direction at the end of its insertion;

a first stopper of the battery unit; which at the end of the insertion of the battery unit presses against the rear edge of the card relative to the pushing direction, thus forcing the card into the location determined by the guide grooves and the stop, with the battery unit in position; and a second stopper of the battery unit, which presses against the card and keeps it pressed against the contacts when the battery unit is in position.

* * * * *